(12) United States Patent
Morancie-Davidson

(10) Patent No.: US 10,851,505 B2
(45) Date of Patent: Dec. 1, 2020

(54) ANIMAL WASTE DISPOSAL MAT

(71) Applicant: Allison Morancie-Davidson, Brooklyn, NY (US)

(72) Inventor: Allison Morancie-Davidson, Brooklyn, NY (US)

( * ) Notice: Subject to any disclaimer, the term of this patent is extended or adjusted under 35 U.S.C. 154(b) by 0 days.

(21) Appl. No.: 16/689,380

(22) Filed: Nov. 20, 2019

(65) Prior Publication Data

US 2020/0157754 A1     May 21, 2020

Related U.S. Application Data

(60) Provisional application No. 62/769,707, filed on Nov. 20, 2018.

(51) Int. Cl.

| A01K 23/00 | (2006.01) |
|---|---|
| A01K 1/01 | (2006.01) |
| E01H 1/12 | (2006.01) |
| A01K 1/015 | (2006.01) |

(52) U.S. Cl.
CPC ......... *E01H 1/1206* (2013.01); *A01K 23/005* (2013.01); *A01K 1/0157* (2013.01)

(58) Field of Classification Search
CPC .. A01K 1/0157; A01K 23/005; E01H 1/1206; E01H 2001/126
USPC .................... 294/1.3, 1.5, 149, 150; 119/867
See application file for complete search history.

(56) References Cited

U.S. PATENT DOCUMENTS

| 4,156,400 | A | * | 5/1979 | Migdal | A01K 23/005 119/161 |
|---|---|---|---|---|---|
| 4,500,129 | A | * | 2/1985 | Hahn | A01G 9/04 294/141 |
| 4,800,677 | A | * | 1/1989 | MacK | A01K 1/0107 119/161 |
| 5,092,681 | A | * | 3/1992 | Ashley | B65D 33/28 383/4 |
| 5,178,426 | A | * | 1/1993 | David | A01K 1/0107 119/161 |
| 5,364,188 | A | * | 11/1994 | Godfried | B65D 75/14 383/4 |
| 7,594,754 | B2 | * | 9/2009 | Costello | B65F 1/00 383/117 |
| 9,445,575 | B2 | * | 9/2016 | Ferguson | A01K 1/0107 |
| 2003/0005891 | A1 | * | 1/2003 | Lu | A01K 23/005 119/867 |
| 2017/0280671 | A1 | * | 10/2017 | Miller | A01K 1/0157 |

* cited by examiner

*Primary Examiner* — Dean J Kramer
(74) *Attorney, Agent, or Firm* — The Iwashko Law Firm, PLLC; Lev Ivan Gabriel Iwashko

(57) ABSTRACT

An animal waste disposal mat, including a main body, a plurality of side flaps each connected to different parts of the main body at first edges, respectively, and a drawstring to connect tip portions of each of the plurality of side flaps together, such that a pulling of the drawstring causes the tip portions of the plurality of side flaps to move toward a direction toward a center point of the main body.

4 Claims, 2 Drawing Sheets

US 10,851,505 B2

ANIMAL WASTE DISPOSAL MAT

CROSS REFERENCE TO RELATED APPLICATION

This application claims the benefit of, and incorporates by reference, U.S. provisional patent application Ser. No. 62/769,707, entitled "Animal Waste Disposal Mat," which was filed on Nov. 20, 2019.

BACKGROUND

1. Field

The present general inventive concept relates generally to a disposal mat, and particularly, to an animal waste disposal mat.

2. Description of the Related Art

There are over seventy million dogs in the United States and the vast majority of dog owners live in urban areas. Many of them live in high-rise buildings without gardens or backyards. Unfortunately, training dogs to use litter boxes, like cats, can become a very difficult task.

Many dog owners walk their pets out onto public property in order to relieve themselves, however, most towns and cities have laws against allowing pets to soil sidewalks, parks, and other public areas trafficked by dogs. So, the dog owner must pick up and cleanly dispose of their canine's waste. Typically, the dog owner places his or her hand inside a plastic bag, grasps the dog waste through the bag, and inverts the bag, in order to enclose the dog waste, so that it can be disposed of in a public trash bin. Many dog owners dislike the experience of picking up their dog's waste, albeit through a plastic bag, and many of those plastic bags are in fact harmful to the environment.

Therefore, there is a need for a disposal mat that allows pet owner's to collect the waste and dispose of it without touching the pet's waste.

SUMMARY

The present general inventive concept provides an animal waste disposal mat.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an animal waste disposal mat, including a main body, a plurality of side flaps each connected to different parts of the main body at first edges, respectively, and a drawstring to connect tip portions of each of the plurality of side flaps together, such that a pulling of the drawstring causes the tip portions of the plurality of side flaps to move toward a direction toward a center point of the main body.

Each of the plurality of side flaps may have a triangular shape.

Each of the plurality of side flaps may be connected to the main body at respective fold edges.

The respective fold edges may cause the main body to retain a rectangular shape.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1:
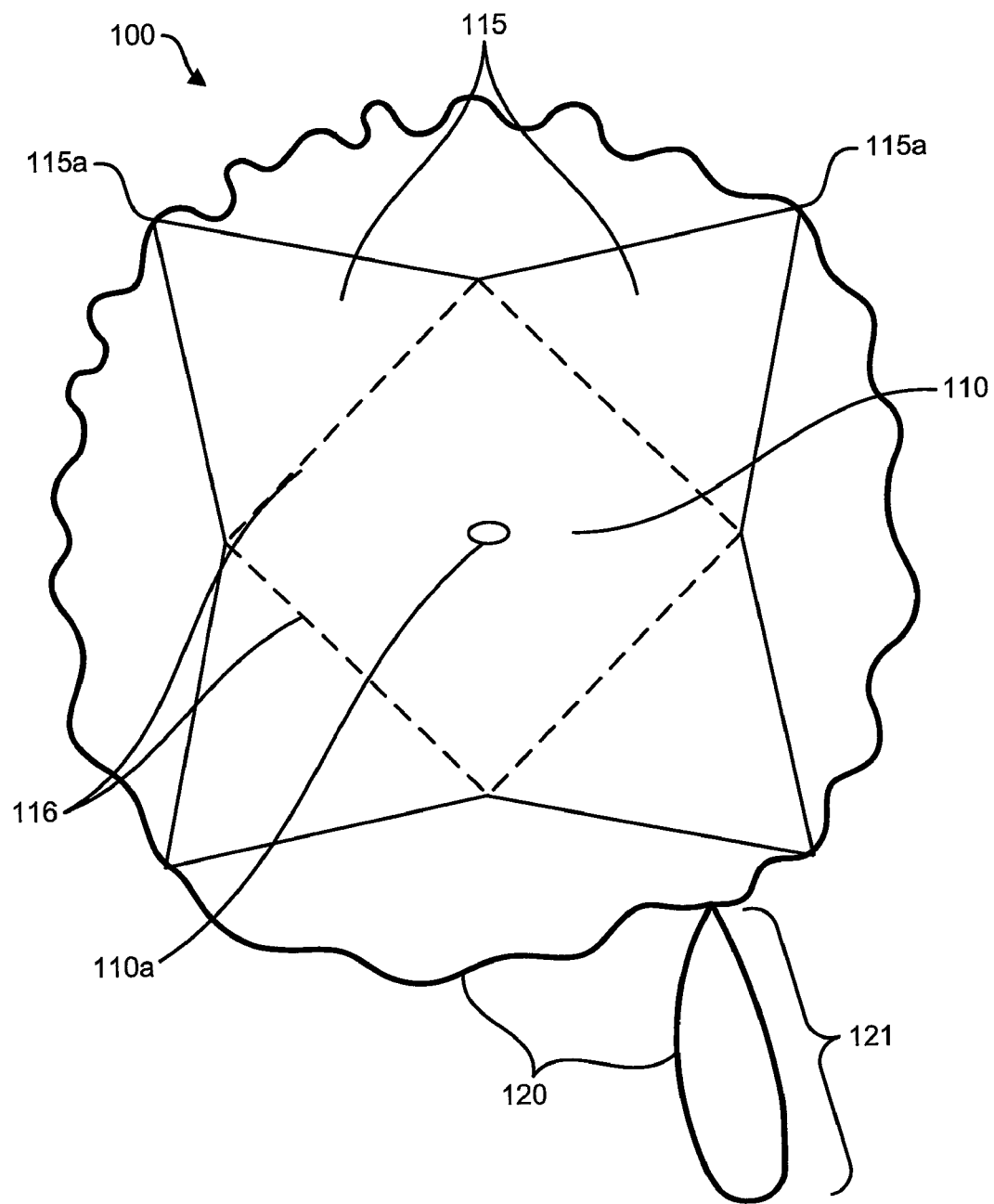
FIG. 1 illustrates a top view of an animal waste disposal mat in an unfolded position, according to an exemplary embodiment of the present general inventive concept.

FIG. 1 illustrates a top view of an animal waste disposal mat 100 in an unfolded position, according to an exemplary embodiment of the present general inventive concept.

Figure 2:
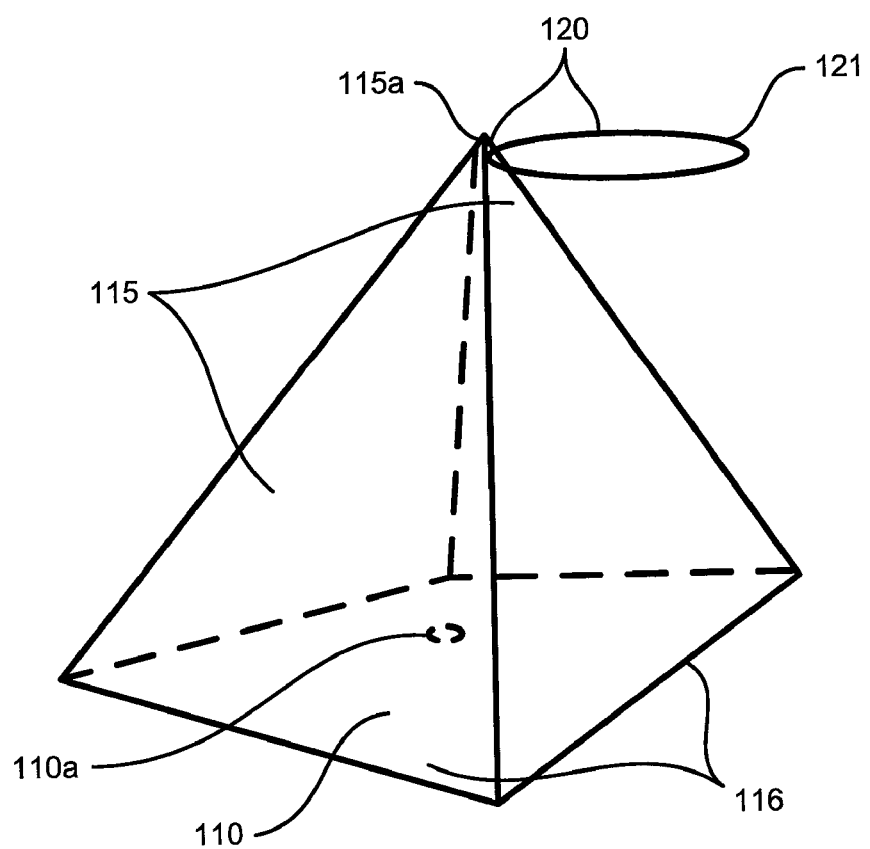
FIG. 2 illustrates a side view of the animal waste disposal mat in a folded position, according to an exemplary embodiment of the present general inventive concept.

FIG. 2 illustrates a side view of the animal waste disposal mat 100 in a folded position, according to an exemplary embodiment of the present general inventive concept.

The animal waste disposal mat 100 may include a main body 110, but is not limited thereto. The main body 110 may be substantially flat in structure when disposed on a substantially flat surface, but may be padded for comfort. Although, the animal waste disposal mat 100 is illustrated in FIG. 1 to have a rectangular prism shape, the animal waste disposal mat 100 may be rectangular, circular, conical, spherical, or any feasible shape desired by a user. The animal waste disposal mat 100 may be constructed from at least one of biodegradable woven plant fiber, plastic, aluminum, paper, etc., but is not limited thereto.

The main body 110 may include a center point 110a, at least one side flap 115, at least one flap tip 115a, at least one fold edge 116, and a drawstring 120. The center point 110a may have a predetermined scent for attracting particular animals that the user has for a pet. The user may select the animal waste disposal mat 100 having the predetermined scent, appropriate for the pet. The drawstring 120 may be constructed of biodegradable metal, cotton, rubber, plastic, etc., but is not limited thereto. Furthermore, the drawstring 120 may be coated or constructed with highly reflective material, such that the drawstring 120 may be visible at night or any other low light conditions. The main body 110 may be of any predetermined size to accommodate pets of various sizes. Specifically, the main body 110 may have a smaller size of eight to nine square inches or a larger size of twelve to fourteen square inches.

Referring to FIGS. 1 and 2, although, the at least one side flap 115 is illustrated in FIG. 1 to have a triangular shape, the at least one side flap 115 may be rectangular, circular, conical, or any feasible shape desired by the user. The at least one side flap 115 may pivot along the at least one fold edge 116 towards the main body 110. The drawstring 120 may be substantially disposed within the at least one flap tip 115a. Alternatively, the drawstring 120 may be substantially disposed entirely within the at least one side flap 115.

The user may guide the pet toward the center point 110a. After the pet has used the animal waste disposal mat 100 by leaving animal waste thereupon, the user may wrap up the animal waste disposal mat 100 by closing the at least one side flap 115.

In order to close the animal waste disposal mat 100, the user may grasp the at least one flap tip 115a and pull it in an upward direction, away from the main body 110, such that the at least one side flap 115 may pivot along the at least one fold edge 116 towards the main body 110. Subsequently, the user may grasp at least a portion of the drawstring 120, nearest to the location in which the user has grasped the at least one flap tip 115a, and may pull the portion of the drawstring 120 in an outward direction, away from the main body 110, forming an extended drawstring 121. As such, the pulling of the portion of the drawstring 120 may cause a reduction in a length of the drawstring 120 in another at least one side flap 115 and another at least one flap tip 115a, such that the drawstring 120 is constricted in the another at least one side flap 115 and the another at least one flap tip 115a. As the user pulls the drawstring 120, the reduction of the length of the drawstring 120 in the another at least one side flap 115 and the another at least one flap tip 115a, may cause the another at least one side flap 115 and the another at least one flap tip 115a to pivot along another at least one fold edge 116 towards the center point 110a. In other words, the at least one flap tip 115a and the at least one side flap 115 may touch the another at least one flap tip 115a and the another at least one side flap 115, substantially near the center point 110a, above the main body 110.

The resulting structure of the at least one side flap 115 and the at least one flap tip 115a may be substantially connected and/or intertwined with the another at least one side flap 115 and the another at least one flap tip 115a, which results in the main body 110 forming a closed pyramidal-type shape. The animal waste may be secure within the main body 110. Moreover, the user may secure the animal waste disposal mat 100 by using the extended drawstring 121 to wrap around the at least one side flap 115 and the at least one flap tip 115a and the another at least one side flap 115 and the another at least one flap tip 115a. As such, any animal waste left within an inner portion of the main body 110 may be secured without a need for the user to have direct contact with the animal waste.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An animal waste disposal mat, comprising:
a main body;
a plurality of side flaps each connected to different parts of the main body at first edges, respectively; and
a drawstring to connect tip portions of each of the plurality of side flaps together, such that a pulling of the drawstring causes the tip portions of the plurality of side flaps to move toward a direction toward a center point of the main body, such that the drawstring is coated with a highly reflective material to be visible at night or low light conditions.

2. The animal waste disposal mat of claim 1, wherein each of the plurality of side flaps have a triangular shape.

3. The animal waste disposal mat of claim 1, wherein each of the plurality of side flaps are connected to the main body at respective fold edges.

4. The animal waste disposal mat of claim 1, wherein the respective fold edges cause the main body to retain a rectangular shape.

* * * * *